March 1, 1949.  S. RUBEN  2,462,998
PRIMARY CELL WITH PERMANGANATE DEPOLARIZER
Filed March 14, 1945
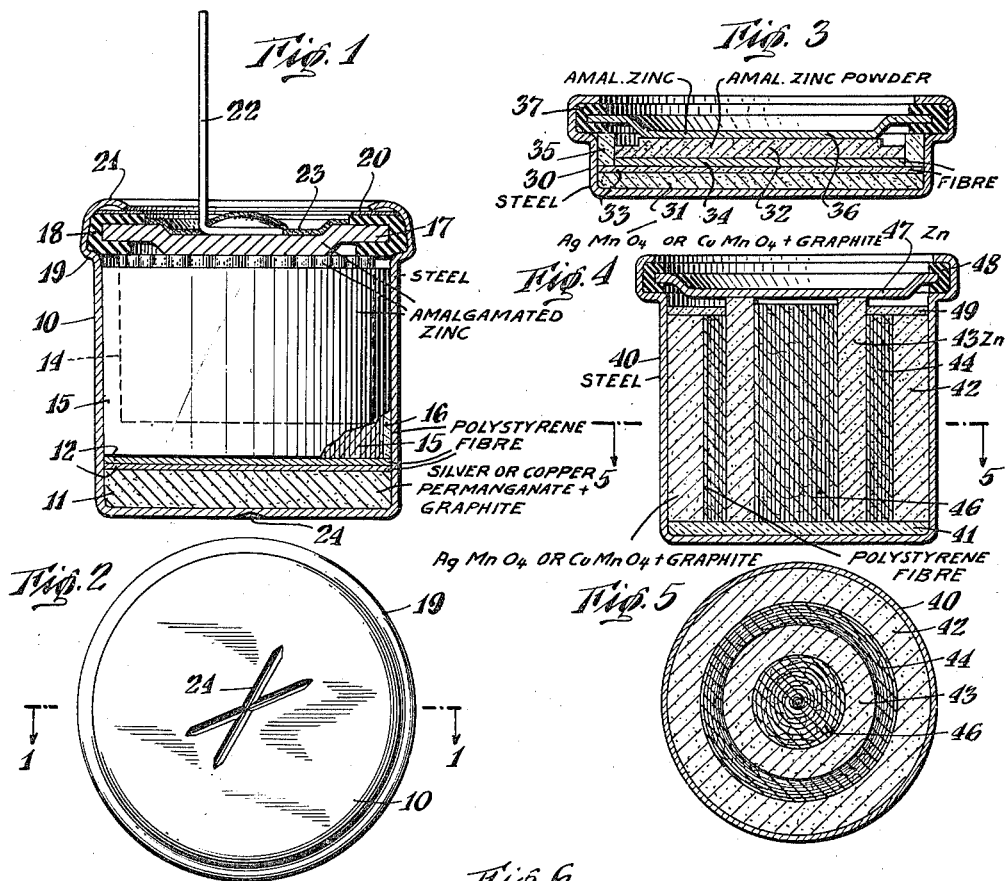
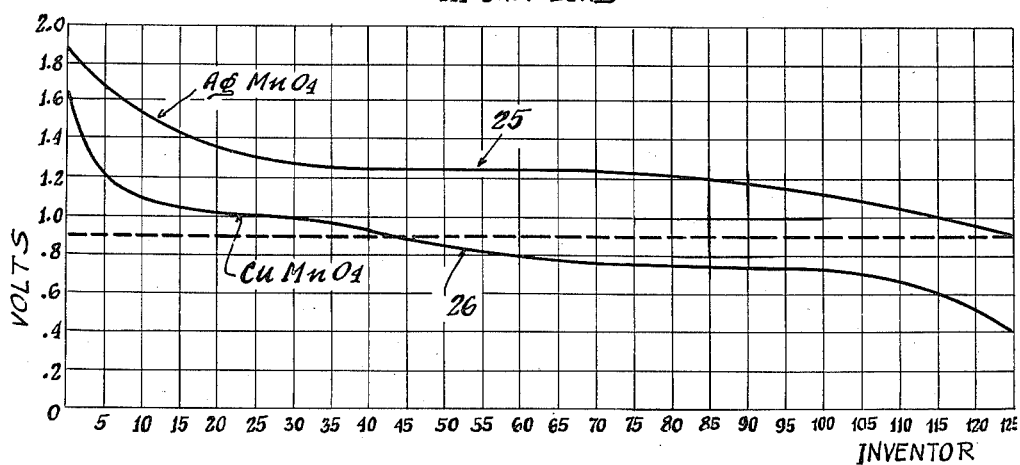
INVENTOR
Samuel Ruben
BY
Chester F. Carlson
ATTORNEY Patented Mar. 1, 1949

2,462,998

UNITED STATES PATENT OFFICE 2,462,998

PRIMARY CELL WITH PERMANGANATE DEPOLARIZER

Samuel Ruben, New Rochelle, N. Y.

Application March 14, 1945, Serial No. 582,594

20 Claims. (Cl. 136—107)

This invention relates to primary cells of the alkaline type. In its preferred embodiment it relates to sealed dry type alkaline primary cells.

An object of the invention is to improve primary cells and the electrodes thereof.

The present invention contemplates a primary cell embodying a cathode formed of a depolarizer composition using silver or copper permanganate intimately mixed with a conductive material. The invention also contemplates features of cell construction which facilitate effective use of the cathode and other cell materials. Other aspects of the invention will be apparent from the following description taken in conjunction with the accompanying drawing, in which Figure 1 is sectional view of a sealed alkaline dry cell embodying features of the invention;

Figure 2 is a bottom view thereof;

Figure 3 is a section of a flat type cell;

Figures 4 and 5 are longitudinal and transverse sections of another cell construction; and Figure 6 is a graph showing curves of primary cell voltage versus time under load.

The present invention contemplates a primary cell embodying a cathode formed of a depolarizer composition using silver or copper permanganate intimately mixed with a conductive material. The invention also contemplates features of cell construction which facilitate effective use of the cathode and other cell materials. Other aspects of the invention will be apparent from the following description and claims.

Referring to the drawings Figures 1 and 2 show a primary cell comprising a steel cup or container 10 in the bottom of which is pressed a cathode pellet 11 of depolarizer composition.

In the preferred embodiment of the present invention the cathode depolarizer composition 11 is an intimate mixture of silver permanganate and graphite so as to produce an electrically conductive cathode element. In order to obtain the best results the graphite particles should be finer than the permanganate particles and the two should be intimately mixed or ball milled together so that the permanganate particles are substantially coated with a graphite film. The permanganate should be as pure as possible and finely divided. Micronized Ceylon graphite (for example, Dixon's 200-09 and 200-12) shows superior properties for this purpose. While the proportions of the graphite may be varied over a considerable range the most suitable compositions contain 1 to 50% graphite and 20 to 30% graphite is preferred, although the specific application of the cell may determine the preferred graphite amount. The composition is compacted to a dense body, a pressure of about 20,000 pounds per square inch being advisable. The ionic conductivity of the solid permanganate crystal is too low to allow its functioning as a cathode depolarizer without addition of a conductive agent.

While graphite is the preferred conductive material other finely divided conductive materials may be substituted for it, or mixed with it, such as very fine silver, silver oxide and the like.

A porous electrolyte-permeable barrier layer is disposed over the top surface of depolarizer 11. The preferred barrier consists of one or more porous discs 12 of a non-oxidizable material, preferably fibrous polystyrene. These may be punched from a 5 mil sheet and then pressed into the cup on top of the depolarizer. Other suitable organic non-oxidizable materials, such as fibrous nylon sheet etc., may be used. Other barriers which are suitable are a pressed disc of magnesium silicate or magnesium hydroxide powder or a mixture of both, or of ceramic powder. These are pressed into the cup simultaneously with pressing of the depolarizer or as a subsequent operation. It is of advantage to use an inert inorganic barrier or non-oxidizable organic barrier in contact with the permanganate-graphite electrode to avoid surface reduction of the permanganate. Cellophane and dialysis parchment paper, while they can be used, are not quite so desirable for this reason.

The anode assembly for the cell comprises a roll of corrugated zinc foil 14 interleaved with a double layer 15 of polystyrene fibre sheet or, in some instances, porous paper. The zinc foil edge extends beyond the fibre layer slightly at one end and the fibre layer extends beyond the zinc at the other end of the roll. At least one complete turn of the fibre sheet encloses the outermost turn of the zinc at the outside of the roll. An impervious insulating sleeve 16 of polystyrene or paper impregnated with polystyrene or other alkali-resistant insulating material encloses the roll and holds it assembled and insulated from the walls of container. A suitable method of making this anode assembly is shown and described in my co-pending application Serial No. 513,687, filed December 10, 1943, now Patent No. 2,422,046.

The anode roll is impregnated with an alkaline electrolyte solution and the zinc foil is amalgamated with mercury in the same operation. Anode rolls are placed in a flat bottom dish with the zinc end up and the electrolyte is poured into the dish slowly allowing the electrolyte to be drawn up into the rolls by capillarity. The porous fibre absorbs the electrolyte and swells into the space afforded by the corrugations of the zinc. Electrolyte is added to cover the rolls and then a measured quantity of mercury is placed on top of each roll in contact with the zinc. A suitable proportion of mercury is 5 to 20% of the weight of the zinc. The dish is then placed in an oven at 60° C. for several hours or until amalgamation of the zinc foil surface is substantially complete.

The rolls are then drained and moderate vacuum applied to remove entrapped gas bubbles. An impregnated anode in this condition is then placed in the container 10 with the projecting fibre end in contact with the less porous polystyrene discs 12 which absorb some of the electrolyte from the projecting fibre end.

An amalgamated zinc top disc 17 of pie-pan shape is placed in the mouth of the container 10 with its depressed center in contact with the projecting zinc foil 14 of the anode roll. A neoprene grommet 18 encloses the edge of disc 17 and rests on a shoulder 19 formed in the container wall. A flat steel ring or washer 20 is placed over the grommet and the free edge 21 of the container is turned or spun down over the top of the washer to place the grommet under compression and seal the cell.

If desired the grommet can be sealed to the surface of the zinc disc with neoprene cement to further insure against electrolyte creepage. A terminal tab 22 is soldered or spot welded to the center of the top disc and then the entire exposed outer zinc surface is sprayed or painted with an air-excluding lacquer 23, such as a mixture of hydrogenated rosin plasticized with mineral oil.

Best performance is obtained from cells having the electrode and spacer elements held together under substantial pressure by the container parts. Thus, it is desirable that the anode roll assembly 14, 15 be compressed by the sealing operation as much as 10% or more.

The preferred electrolyte is a solution of potassium hydroxide which has been substantially saturated with zinc oxide by heating in the presence of excess zinc oxide and then filtering. A solution containing about 38% KOH and 6.4% ZnO is very satisfactory although the concentration can be varied over a wide range. For most practical applications the KOH amounts to about 20% to 50% of the solution with sufficient ZnO to saturate the solution. This electrolyte and its advantages are described more fully in my co-pending application Serial No. 486,367, filed May 10, 1943, as well as application Serial No. 513,687 above referred to.

Other electrolytes can be used in the cell, especially where it is intended for use at low temperature and appropriate venting means are used, such as straight solutions of KOH, NaOH or LiOH or mixtures of these.

In some cases it may be necessary or desirable to provide venting means, which are normally closed but which will relieve gas pressure, should any gas develop after complete use of the depolarizer. One convenient venting arrangement is illustrated in Figures 1 and 2, which comprises a pair of crossed chisel grooves 24 on the bottom of the container which do not completely penetrate the wall. The cell is therefore completely sealed but if gas pressure should develop the cross will open up sufficiently to permit escape of the gas. Another method is to amalgamate the zinc top to such an extent as to become brittle so that if an excess gas pressure is had after complete use of the depolarizer, any bulging caused by the gas pressure will cause cracks to appear and venting takes place through the cracks. Still another method of venting is to use a porous oil impregnated sealing grommet of neoprene or other suitable inert resilient material in a ring shape such as shown at 18. This allows some passage of gas outward through the porous grommet should internal gas pressure develop.

Figure 6 is a graph showing curves of voltage versus time under load obtained with cells of the construction described having depolarizer cathodes of $AgMnO_4$ mixed with 20% micronized graphite, and of $CuMnO_4$ mixed with 20% graphite. The cells had a diameter of 7/8 inch and were 5/8 inch high. The zinc anodes were each formed of 2 mil zinc foil corrugated with 2 mil deep corrugations the corrugated foil strips being $\frac{9}{32}$ inch wide and 36 inches long. The foil is wound up with two 4 mil porous paper spacers 3/8 inch wide. The depolarizer in each case was formed into a pellet and compressed into the bottom of the can at 20,000 pounds per square inch. The $AgMnO_4$-graphite pellet weighed 2.9 grams. The $CuMnO_4$-graphite pellet weighed 2.1 grams. The paper spacers were impregnated with 2.5 grams of electrolyte containing 38% KOH and 6.4% dissolved $ZnO_2$. The barrier 12 consisted of two 5 mil porous polystyrene fibre discs. The areas of the top of the cathode pellets were 0.54 square inch.

The cells were each discharged through a 111 ohm load until their voltages fell to an arbitrary cut-off value of 0.9 volt. It will be noted from graph curve 25, for the cell using silver permanganate that the initial voltage under load was 1.86 volts and after an initial drop the curve flattens out considerably reaching 0.9 volt after 125 hours under continuous load. Curve 26 is a similar curve for the $CuMnO_4$ cell. The cut-off voltage was reached after about 42 hours.

The two curves represent continuous initial runs under 111 ohm load until the voltage dropped to 0.9 volt. If the cells are allowed to recuperate the voltage rises again and further output can be obtained above the cut-off voltage for several cycles, giving a much longer total run.

The original open circuit voltage of the silver permanganate cells was 1.96 volts and that of the copper permanganate cells 1.94 volts.

Cells made without graphite or other conductive material mixed with the permanganates dropped off in voltage to a low value almost as soon as they were connected to a load.

Figure 3 shows a flat cell construction comprising a shallow steel cup 30 containing a silver or copper permanganate-graphite depolarizer cathode 31 and a pressed zinc powder anode 32. The depolarizer composition 31 is pressed in the bottom of the container 30 and a barrier disc 33, which may be porous polystyrene, pure asbestos, pressed glass powder, zinc oxide, magnesium silicate or magnesium hydroxide powder for example, is pressed on top of it. An insulating sleeve ring 35 is set on the barrier and against the side wall of the cell. This may be of polystyrene or other alkali-resistant pliant material. One or more porous fibre discs 34 are impregnated with electrolyte and laid on the barrier inside the sleeve 35. The anode comprises a disc pressed from iron-free zinc powder which has been amalgamated with 5 to 15% of mercury. It may also be made from zinc granules or pellets which have been amalgamated. Amalgamated zinc top 36 presses against the top of the anode and holds it tightly against fibre disc 34. The top 36 is sealed in the mouth of cup 30 by neoprene grommet 37 which is compressed against it by the enclosing edge of the container.

Figures 4 and 5 illustrate a cylindrical electrode construction in a primary cell embodying other features of the present invention. The deep steel container 40 has a liner disc 41 of polystyrene on its bottom. Upon this rest a group of concentric cylinders. The outer cylinder 42 is of pressed permanganate-graphite composition and is fitted or pressed rather tightly against the cylindrical can wall.

The anode comprises a pressed amalgamated zinc powder cylinder 43 which stands slightly higher than the depolarizer electrode. Between the anode 43 and the depolarizer cathode 42 is a spacer 44 comprising a winding about 40 mils thick of porous polystyrene fibre sheet, or the combination of paper adjacent the anode and polystyrene fibre adjacent the cathode.

Instead of layers of sheet materials, the spacer can be of a compressed absorbent material such as a pressed cylinder of a mixture of magnesium hydroxide and magnesium silicate, polystyrene fibres or a ceramic material.

The hollow interior of the anode is filled with a wad or roll 46 of porous polystyrene fibre or paper. The electrolyte is added to this roll and quickly passes through the porous anode and spacer 44 by capillary action and even to some extent into the depolarizer to effect uniform distribution of electrolyte. No excess free flowing electrolyte is allowed to remain. The fibre or paper swells in the electrolyte exerting a pressure against the anode and cathode cylinders. Polystyrene ring disc 49 covers the top of cylinders 42 and 44.

The amalgamated zinc top 47 is pressed against the top end of anode cylinder 43 and is sealed in the mouth of the container by neoprene grommet 48. It will be noted that the length of the cell can be varied without changing the ratio of the anode and cathode volumes or surfaces.

During cell operation the electrolyte reacts with the zinc and zinc hydroxide is precipitated on the anode forming a coating thereon. By using an anode of large surface area as set forth in my above mentioned applications the coating never reaches a thickness where it will interfere with useful operation of the cell until the depolarizer has been consumed. For maximum cell life the zinc surface area should be preferably at least 4 square inches per gram of the depolarizer.

The electrolyte is constantly regenerated so that only a small quantity is necessary to the continued functioning of the cell.

The cells described herein are found to have a longer life on intermittent service than on continuous use at the higher drains. They appear to recuperate and return to higher voltage during periods of non-use.

It is of importance in avoiding local action for the zinc used for the anode to be substantially pure. The iron content particularly should be kept low, preferably below .003%. Other metals such as copper and tin should be kept below this proportion.

The barrier layer between the cathode and the anode being electrolyte permeable permits cell operation but substantially prevents migration of compounds from the cathode toward the anode.

The cell contains no free-flowing or freely-circulating electrolyte, as a result of keeping the weight ratio of electrolyte to fibre between 3:1 and 6:1 in the case where polystyrene fibre is used. This factor further restricts travel of compounds to the anode where they would cause deleterious local action and is one of the most basic factors necessary for long shelf life.

In relation to the depolarizer the amount of electrolyte within the cell may be about 0.3 gram per gram of depolarizer in the flat and cylindrical structures and about 0.8 gram electrolyte per gram of depolarizer in the coiled foil anode type.

In the manufacture of the cell it is desirable that the permanganate and graphite be substantially compressed as to produce an electrically conductive mass. An excess of electrolyte is to be avoided.

There should be only sufficient electrolyte in the spacer to allow conduction and ionic migration but insufficient to allow dissolving of the permanganate by circulation or flow of the electrolyte. If the permanganate is used with a wet or free flow electrolyte construction it would rapidly dissolve and decompose into the electrolyte and adequate shelf life would not be possible.

The barrier is of considerable importance. It should limit circulation of the electrolyte and it should have substantially no reducing action on the permanganate, particularly where high temperature operation of the cell is to be encountered.

The use of the more reactive organic materials, such as paper, in contact with the depolarizer is generally to be avoided. The more stable organic materials, such as polystyrene fibre, or inorganic barriers are preferred. While paper can sometimes be used in other parts of the cell, such as for spacing apart the turns of the anode foil, some advantage is gained even here in using a less reactive material.

The permanganates described in this application as well as the ones described in my prior application Serial No. 575,090 are the water soluble permanganates. The combination and arrangement of cell elements described herein makes possible the use of such soluble permanganates in solid form. For example, the use of an electrolyte retaining spacer or barrier layer in contact with the cathode prevents free circulation of the electrolyte which would dissolve and carry away the permanganate but permits the ionic conduction necessary for cell operation, and permits efficient depolarizer action at the cathode surface.

While specific embodiments of the invention have been described, it is intended to cover the invention broadly within the spirit and scope of the appended claims.

What is claimed is:

1. A primary cell comprising a zinc anode, a cathode comprising an intimate mixture of a permanganate selected from the group consisting of silver and copper permanganates in solid state and a finely divided conductive material, a porous spacer between said anode and cathode and in contact therewith, and an alkaline electrolyte absorbed in said spacer.

2. A primary cell comprising a zinc anode, a cathode comprising an intimate mixture of a permanganate selected from the group consisting of silver and copper permanganates and a finely divided conductive material, a porous spacer between said anode and cathode and in contact therewith, and an alkaline electrolyte absorbed in said spacer, said cell being characterized by the absence of any freely flowing electrolyte not held in said spacer.

3. A primary cell comprising a zinc anode, a cathode comprising an intimate mixture of graphite and a permanganate of metal selected from the group consisting of silver and copper, a porous spacer between said anode and cathode and in contact therewith, and an alkaline electrolyte absorbed in said spacer, a container for said anode, cathode and electrolyte impregnated spacer, and conductive terminals comprising part of said container, and connected respectively to said anode and cathode, and sealing means insulating said terminals from each other and sealing said cell.

4. A primary cell comprising a zinc anode, a cathode comprising solid permanganate of a metal selected from the group consisting of silver and copper, and a conductive material mixed therewith, a porous spacer between said anode and cathode and in contact therewith, at least part of said spacer comprising porous substantially inert organic fibre, and an alkaline electrolyte absorbed in said spacer, said electrolyte in said fibre being present in proportions between 3 and 5 times the weight of said fibre.

5. A primary cell comprising a zinc anode, a cathode comprising solid permanganate intimately mixed with graphite, said permanganate being selected from the group consisting of silver and copper permanganates, a porous spacer between said anode and cathode and in contact therewith, and an electrolyte comprising an alkaline solution impregnating said spacer.

6. A primary cell comprising a zinc anode, a cathode comprising solid permanganate intimately mixed with graphite of a finer particle size than that of said permanganate, said permanganate being selected from the group consisting of silver and copper permanganates, a porous spacer between said anode and cathode and in contact therewith, and an electrolyte comprising an alkaline solution impregnating said spacer, said electrolyte being substantially saturated with alkali metal zincate and said anode having a large surface area.

7. A primary cell comprising a zinc anode, a cathode comprising solid permanganate of metal selected from the group consisting of silver and copper intimately mixed with graphite of a finer particle size than that of said permanganate, a porous spacer between said anode and cathode and in contact therewith, and an electrolyte comprising an alkaline solution impregnating said spacer, said electrolyte being substantially saturated with alkali metal zincate and said anode having a large surface area, a hermetically sealed container having terminals connected to said anode and cathode respectively, enclosing said anode, cathode and electrolyte impregnated spacer, and said cell being further characterized by the absence of any freely flowing electrolyte therein.

8. A primary cell comprising a zinc anode, a cathode comprising an intimate mixture of solid permanganate of metal selected from the group consisting of silver and copper and a conductive material, a porous spacer between said anode and cathode and in contact therewith, and an electrolyte comprising an alkaline solution impregnating said spacer, said spacer including a porous barrier of ionically permeable non-reactive material which is inert to said electrolyte and to said permanganate covering the electrolyte-engaging surface of said cathode.

9. A primary cell comprising a zinc anode, a cathode comprising an intimate mixture of permanganate of metal selected from the group consisting of silver and copper and a conductive material, a porous spacer between said anode and cathode and in contact therewith, and an electrolyte comprising an alkaline solution impregnating said spacer, said spacer including a porous barrier of ionically permeable material which is inert to said electrolyte and to said permanganate covering the electrolyte-engaging surface of said cathode and a layer of porous paper between said barrier and said anode.

10. A primary cell comprising a zinc anode of large surface area, a cathode comprising an intimate mixture of permanganate of an element selected from the group consisting of silver and copper, and finely-divided graphite, a porous spacer interposed between said anode and cathode and in contact therewith, said spacer comprising a barrier layer of semi-permeable material inert to said electrolyte and to said permanganate covering the electrolyte-engaging surface of said cathode and a layer of porous paper between said barrier layer and said anode, and an electrolyte impregnating said spacer comprising a solution of potassium hydroxide substantially saturated with dissolved zinc oxide.

11. A primary cell comprising a cylindrical cathode formed of an intimate mixture of a permanganate of an element selected from the group consisting of silver and copper, and a finely-divided conductive material, a cylindrical anode spaced within said cathode and substantially concentric therewith formed of a pressed cylinder of amalgamated zinc powder, a porous spacer between said anode and cathode, said spacer and anode being impregnated with an alkaline electrolyte.

12. An electrode for alkaline primary cells comprising a solid permanganate of an element selected from the group consisting of silver and copper.

13. A cathode depolarizer element for alkaline primary cells comprising a solid permanganate of a metal selected from the group consisting of silver and copper.

14. An electrode for primary cells comprising a substantially non-electrically conductive solid silver permanganate mixed with a conductive material.

15. A primary cell containing a cathode comprising a solid silver permanganate, an anode comprising zinc, and an alkaline electrolyte.

16. A cathode depolarizer element for alkaline dry cells comprising a mixture of crystals of a permanganate of an element selected from the group consisting of silver and copper, and graphite compressed into an electrically conductive body.

17. A primary cell comprising a zinc anode, an alkaline electrolyte, and a cathode comprising solid silver permanganate, a barrier in contact with said permanganate and interposed between it and said anode, said barrier permitting ionic conduction therethrough, said barrier being substantially unreactive with said permanganate.

18. In a primary cell, a silver permanganate cathode, an anode, an electrolyte absorbent non-reactive spacer and an inert porous barrier member in contact with said permanganate and said non-reactive spacer, and an electrolyte in said spacer.

19. A primary cell comprising an amalgamated zinc anode, a cathode comprising a conductive material mixed with a permanganate of metal selected from the group consisting of silver and copper, a body of alkaline electrolyte between said anode and cathode in contact therewith, and a layer of porous material substantially inert to said permanganate covering the electrolyte-engaging surface of said cathode.

20. A primary cell comprising an anode, a cathode formed of a permanganate of a metal selected from the group consisting of silver and copper, and an electrolyte in contact therewith which is capable of generating a current by reaction therewith.

SAMUEL RUBEN.

REFERENCES CITED

The following references are of record in the file of this patent:

UNITED STATES PATENTS

| Number | Name | Date |
| --- | --- | --- |
| 720,592 | Kohn | Feb. 17, 1903 |
| 1,486,726 | Bufford | Mar. 11, 1924 |

FOREIGN PATENTS

| Number | Country | Date |
| --- | --- | --- |
| 163,744 | Great Britain | May 30, 1921 |